(12) United States Patent
Kelner et al.

(10) Patent No.: US 10,140,036 B2
(45) Date of Patent: Nov. 27, 2018

(54) MULTI-PROCESSOR NON-VOLATILE MEMORY SYSTEM HAVING A LOCKLESS FLOW DATA PATH

(71) Applicant: SanDisk Technologies LLC, Plano, TX (US)

(72) Inventors: Vered Kelner, Moshav Gan Haim (IL); Noga Deshe, Raanana (IL); Alon Banin, Elad (IL); Gadi Vishne, Petach-Tikva (IL); Yevgeny Zagalsky, Kfar Saba (IL); Ilya Gusev, Gedera (IL); Eran Ben Abou, Bee sheva (IL)

(73) Assignee: SanDisk Technologies LLC, Plano, TX (US)

( * ) Notice: Subject to any disclaimer, the term of this patent is extended or adjusted under 35 U.S.C. 154(b) by 11 days.

(21) Appl. No.: 15/169,117

(22) Filed: May 31, 2016

(65) Prior Publication Data
US 2017/0123696 A1  May 4, 2017

Related U.S. Application Data

(60) Provisional application No. 62/248,072, filed on Oct. 29, 2015.

(51) Int. Cl.
*G06F 3/06* (2006.01)
*G06F 13/16* (2006.01)

(52) U.S. Cl.
CPC .......... *G06F 3/0619* (2013.01); *G06F 3/0659* (2013.01); *G06F 3/0688* (2013.01); *G06F 13/1668* (2013.01)

(58) Field of Classification Search
CPC ..... G06F 3/0619; G06F 3/0659; G06F 3/0688
USPC .......................................................... 711/103
See application file for complete search history.

(56) References Cited

U.S. PATENT DOCUMENTS

| | | | | |
|---|---|---|---|---|
| 6,131,113 A | * | 10/2000 | Ellsworth | G06F 9/52 709/213 |
| 7,664,928 B1 | * | 2/2010 | Andrews | G06F 9/30043 712/14 |
| 9,274,861 B1 | * | 3/2016 | Karppanen | G06F 9/544 |
| 2005/0188129 A1 | * | 8/2005 | Abdelilah | G06F 13/28 710/52 |
| 2010/0070730 A1 | * | 3/2010 | Pop | G06F 8/4442 711/167 |
| 2012/0265945 A1 | * | 10/2012 | Miyasaka | G07G 1/0009 711/153 |
| 2015/0154132 A1 | | 6/2015 | Tuers et al. | |
| 2015/0169384 A1 | | 6/2015 | Srinivas et al. | |
| 2015/0205646 A1 | | 7/2015 | Singh | |

(Continued)

OTHER PUBLICATIONS

International Search Report and Written Opinion dated Dec. 5, 2016 for corresponding application No. PCT/US2016/051674.

*Primary Examiner* — Mano Padmanabhan
*Assistant Examiner* — William E. Baughman
(74) *Attorney, Agent, or Firm* — Loza & Loza, LLP; Gabriel Fitch (57) ABSTRACT

A system and method is disclosed for managing a non-volatile memory system having a multi-processor controller. The controller may be configured with a plurality of processors and a shared data queue in a cyclic data buffer. Each of the plurality of processors may manage a separate pointer pointing to a different entry of the shared data queue and multiple ones of the processors may concurrently access or update entries in the shared data queue.

19 Claims, 8 Drawing Sheets

(56) References Cited

U.S. PATENT DOCUMENTS

2016/0005495 A1\* 1/2016 Lasser ................ G06F 12/0246
 711/103
2016/0080491 A1 3/2016 Sykes et al.

\* cited by examiner

MULTI-PROCESSOR NON-VOLATILE MEMORY SYSTEM HAVING A LOCKLESS FLOW DATA PATH

CROSS-REFERENCE TO RELATED APPLICATION

This application claims the benefit of U.S. Provisional Application Ser. No. 62/248,072, filed Oct. 29, 2015, the entirety of which is hereby incorporated herein by reference.

BACKGROUND

Non-volatile memory systems, such as solid state drives (SSDs) including NAND flash memory, are commonly used in electronic systems ranging from consumer products to enterprise-level computer systems. Controllers in some SSDs often manage high throughput data traffic between one or more hosts and the multiple non-volatile memory die in the SSD. The high throughput combined with larger numbers of non-volatile memory die can result in processing demands in the SSD that lead to the need for a multi-processor controller. However, some host controller interface standards, such as non-volatile memory express (NVMe), allow a large number of tasks to be performed out of order by a multi-processor controller and may present a challenging problem of managing multiple processors in a SSD concurrently. Another challenge that may arise in a multi-controller SSD is the need to prevent data conflicts, such as one processor reading invalid data before a request was completed by another processor in the SSD.

Some prior multi-processor SSD architectures utilized two data path processors, each with a respective command queue, where commands were copied between the two different command queues. In order to copy commands between queues, a shared memory buffer was used. To protect a shared data resource, a software tool called mutual exclusion (mutex) is often used. A mutex is meant to be taken and released, always in that order, by each task that uses the shared resource it protects. However, locking of a processor in a multi-processor SSD by a mutex may occur in a multi-processor architecture. This is because the mutex operates such that only one processor can access the shared resource at a time and other processors are forced to wait until the resource is released by the first processor.

DETAILED DESCRIPTION

In a multi-processor memory system, a mutual exclusion (mutex) software tool that locks out all other processors in a controller from accessing commands in a queue while another processor is acting on the queue can limit controller performance. Also, the use of multiple queues in a multi-processor memory system, where commands are copied between the different command queues, there may be appreciable processing overhead that is necessary. A method and system are disclosed below for a multi-processor non-volatile memory system with a common data path buffer where no mutex software is necessary and thus no mutex locking problems are at issue.

The method and system discussed below utilizes multiple processors and a shared data path cyclic buffer, along with additional buffers, to manage data path operations executed by the multiple processors without locking shared memory resources. The different processors in the multi-processor controller may use an inter-process communication protocol for messaging. A main data path shared cyclic buffer is used to store commands and messages that flow between the multiple processors of the non-volatile memory system utilizing separate cyclic pointers for each of the multiple processors. The multiple processors of the non-volatile memory system are configured to send inter-processor communication messages, such as interrupt requests, to each other. By coordinating access to the shared cyclic memory buffer with separate pointers, the respective processors do not overwrite valid commands or messages by avoiding accessing the same location in the shared data path cyclic buffer location. As described in greater detail below, the ability to concurrently have multiple processors in the controller access and change different buffer locations in the shared data path cyclic buffer may be achieved without the need for using a mutex software tool that only permits one processor to operate on a shared buffer at a time and locking out remaining processors from the shared data path cyclic buffer resource.

According to one aspect, a method is disclosed for managing operations in a non-volatile memory system having a controller with a plurality of processors and a data path queue shared by the plurality of different processors. The method may include a first processor of the plurality of processors in the controller accessing data at a first entry location of the shared data path queue. The first processor may then proceed with updating a first pointer to point to a next entry location adjacent to the first entry location in the shared data path queue after accessing the data at the first entry location. The method may also include a second processor of the plurality of processors in the controller accessing data in a different entry location in the shared data path queue at least partially concurrently with the first processor accessing the data at the first entry location. When the first pointer is not pointing to a second next entry location in the shared data path queue immediately adjacent the different entry, the second processor may update a second pointer to point to the second next entry location. When the first pointer is pointing to the second next entry location in the data path queue, the second processor may wait until the first pointer moves away from the second next data entry before updating the second pointer to point to the second next entry.

In different implementations, the shared data path queue may be stored in a cyclic data buffer and updating the first pointer and updating the second pointer may consist of the first processor only moving the first pointer in a single direction along the cyclic data buffer and the second processor only moving the second pointer in the same direction along the cyclic data buffer. Each of the first and second processors may continue to operate on entry locations of the shared data path queue and update their respective pointers to point to respective next entry locations in the first direction unless updating one of the pointers results in one of the pointers pointing to a same entry location currently pointed to a pointer for any of the plurality of processors.

According to another aspect of the invention, a non-volatile memory system is disclosed. The non-volatile memory system includes a non-volatile memory, a shared data path queue for host commands, the shared data path queue having a plurality of entry locations, and a controller in communication with the non-volatile memory and the shared data path queue. The controller includes a plurality of processors. Each of the plurality of processors is configured to exclusively control a respective data path queue pointer pointing to a respective one of the plurality of entry locations. Each of the plurality of processors is also configured to operate on, or update, a host command in an entry location currently pointed to by its respective data path queue pointer, and then update its respective data path queue pointer to point to a next entry location in the shared data path queue only when the next entry location is not already being pointed to by another data path queue pointer. Also, each of the plurality of processors is configured to concurrently operate on different host commands in different ones of the plurality of entry locations in the shared data path queue. Thus the processor attempting to update its respective pointer to a location in the shared data path queue already pointed to by another pointer is not permitted to operate on or change a command or data at that location until the other pointer no longer points to that location. Each of the multiple processors may be configured such that it may only update its respective pointer to point to a next location in the shared data path queue in a common direction.

In yet another aspect, a method is disclosed for managing operations in a non-volatile memory system having a non-volatile memory, a controller in communication with the non-volatile memory and having a plurality of processors, and a data path queue for host commands shared by the plurality of different processors. The method includes a first processor of the plurality of processors in the controller performing a first operation relating to a first host command at a first entry location of the shared data path queue, where the first processor updates a first pointer to point to a first next entry location adjacent to the first entry location in a predetermined direction along the shared data path queue after performing the first operation at the first entry location. The method includes a second processor of the plurality of processors performing a second operation to a second host command at a second entry location in the shared data path queue at least partially concurrently with the first processor performing the first operation at the first entry location. The second processor updates a second pointer to point to a second next entry location in the shared data path queue, where the second next entry location is adjacent the second entry in the predetermined direction along the shared data path queue, only when the second next entry location is not already being pointed to by the first pointer.

In yet another aspect, a non-volatile memory system is disclosed that includes a non-volatile memory, a shared data path queue having a plurality of entry locations for storing host commands directed to the non-volatile memory and a controller in communication with the non-volatile memory and the shared data path queue. The controller comprises a plurality of processing means, each of the plurality of processing means for operating on different host commands in the shared data path queue at least partially concurrently with each other of the plurality of processing means, and for preventing concurrent operations with each other of the plurality of processing means on a same command in a same entry location of the shared data path queue.

Figures 1A, 1B:
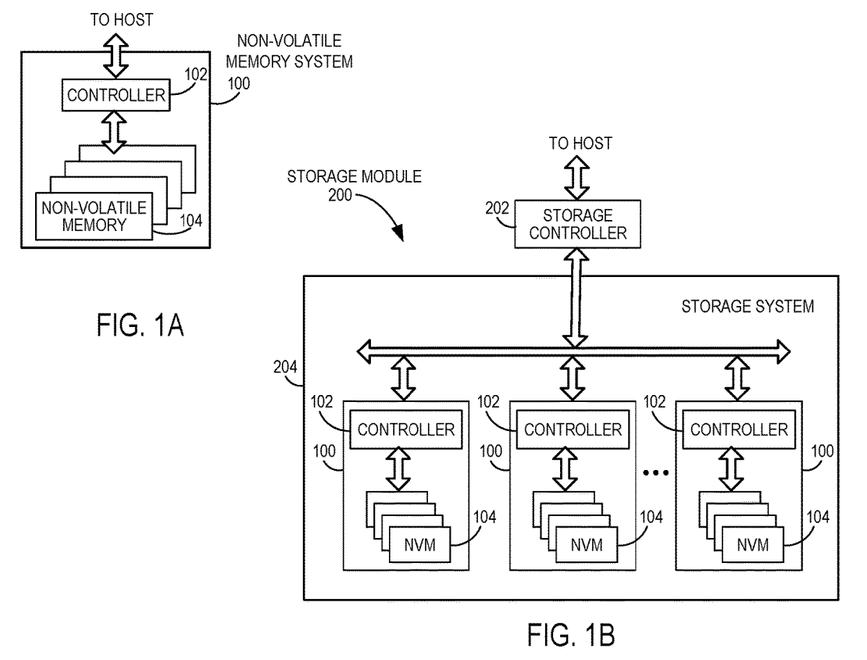
FIG. 1A is a block diagram of an example non-volatile memory system.
FIG. 1B is a block diagram illustrating an exemplary storage module.

FIG. 1A is a block diagram illustrating a non-volatile memory system. The non-volatile memory (NVM) system 100 includes a controller 102 and non-volatile memory that may be made up of one or more non-volatile memory die 104. As used herein, the term die refers to the set of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a flash memory controller) can take the form of processing circuitry, one or more microprocessors or processors (also referred to herein as central processing units (CPUs)), and a computer-readable medium that stores computer-readable program code (e.g., software or firmware) executable by the (micro)processors, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare cells to be substituted for future failed cells. Some part of the spare cells can be used to hold firmware to operate the flash memory controller and implement other features. In operation, when a host needs to read data from or write data to the flash memory, it will communicate with the flash memory controller. If the host provides a logical address to which data is to be read/written, the flash memory controller can convert the logical address received from the host to a physical address in the flash memory. The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, memory system 100 may be a card based system, such as a secure digital (SD) or a micro secure digital (micro-SD) card. In an alternate embodiment, memory system 100 may be part of an embedded memory system.

Although in the example illustrated in FIG. 1A NVM system 100 includes a single channel between controller 102 and non-volatile memory die 104, the subject matter described herein is not limited to having a single memory channel. For example, in some NAND memory system architectures, such as in FIGS. 1B and 1C, 2, 4, 8 or more NAND channels may exist between the controller and the NAND memory device, depending on controller capabilities. In any of the embodiments described herein, more than a single channel may exist between the controller and the memory die, even if a single channel is shown in the drawings.

FIG. 1B illustrates a storage module 200 that includes plural NVM systems 100. As such, storage module 200 may include a storage controller 202 that interfaces with a host and with storage system 204, which includes a plurality of NVM systems 100. The interface between storage controller 202 and NVM systems 100 may be a bus interface, such as a serial advanced technology attachment (SATA) or peripheral component interface express (PCIe) interface. Storage module 200, in one embodiment, may be a solid state drive (SSD), such as found in portable computing devices, such as laptop computers, and tablet computers.

Figure 1C:
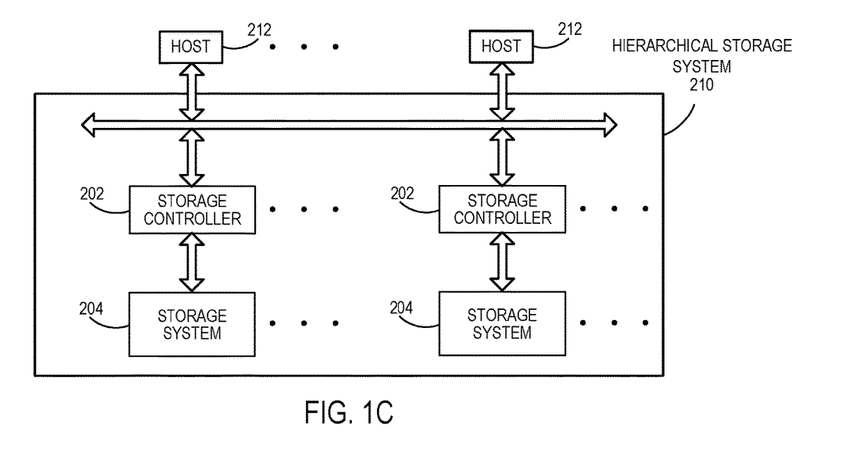
FIG. 1C is a block diagram illustrating a hierarchical storage system.

FIG. 1C is a block diagram illustrating a hierarchical storage system. A hierarchical storage system 210 includes a plurality of storage controllers 202, each of which controls a respective storage system 204. Host systems 212 may access memories within the hierarchical storage system via a bus interface. In one embodiment, the bus interface may be a non-volatile memory express (NVMe) or a fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
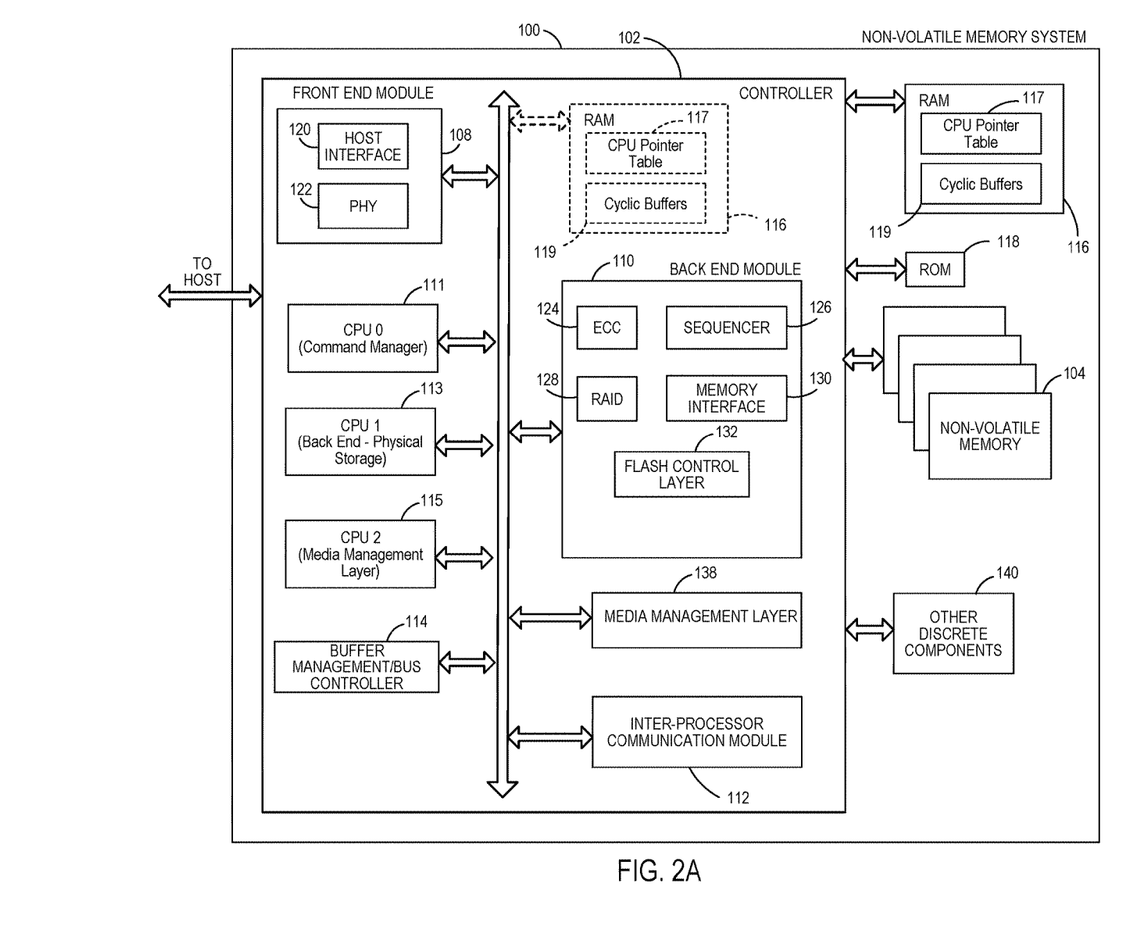
FIG. 2A is a block diagram illustrating exemplary components of a controller of a non-volatile memory system.
Figure 2B:
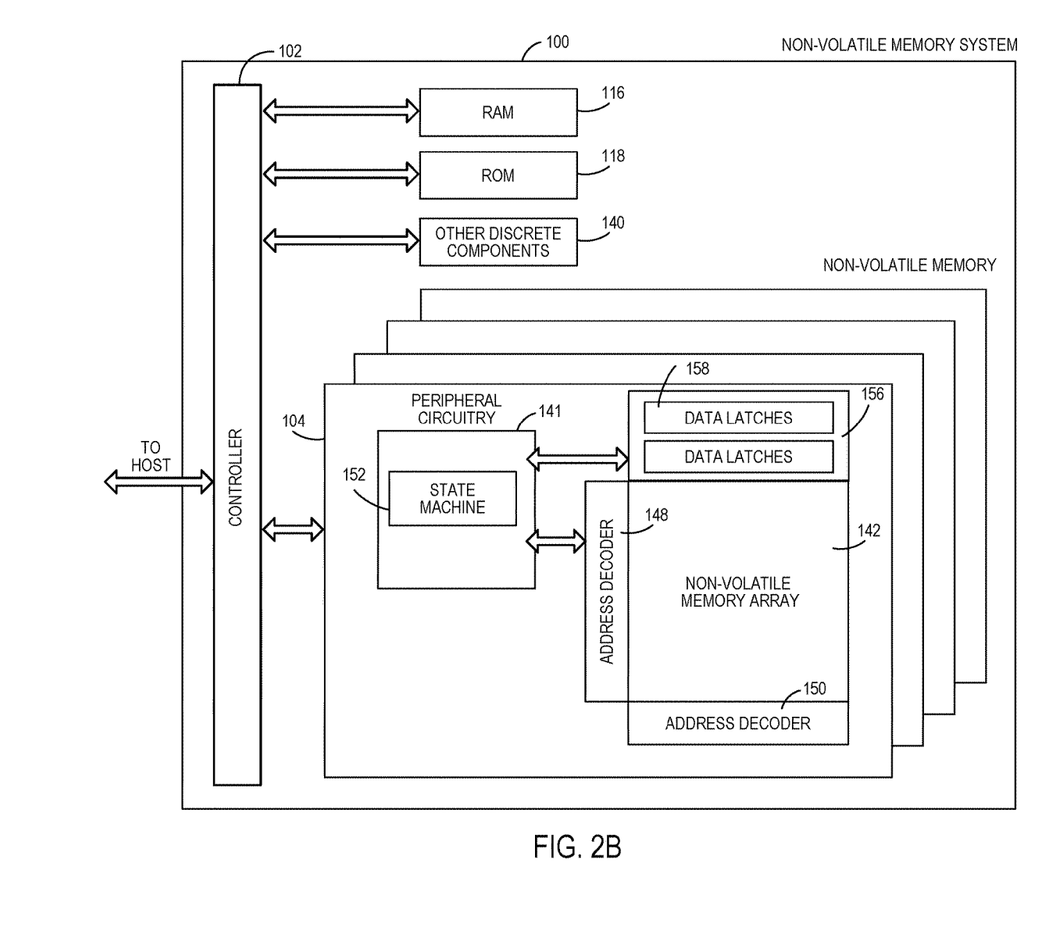
FIG. 2B is a block diagram illustrating exemplary components of a non-volatile memory of a non-volatile memory storage system.

FIG. 2A is a block diagram illustrating exemplary components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. In one embodiment, separate processors, such as central processing units (CPUs) CPU0 111, CPU1 113 and CPU2 115 may be part of or assigned to the front end module 108, the back end module 110 and the media management layer 138 (also referred to as the flash translation layer), respectively. CPU0 manages the host interface 120 and implements a command manager (CM) function that translates host commands received from a host into a format usable by the NVM system and inserts the translated commands into a cyclic buffer shared by CPU0, CPU1 and CPU2. CPU0 exclusively manages a first cyclic pointer that points to a location or entry in a data path queue in the cyclic buffer. CPU1 manages the backend module 110, which may also referred to as the physical storage layer (PS), and specifically manages read and write operations to and from the non-volatile memory. CPU1 may be configured to read and update commands stored in the shared cyclic buffer without releasing the entry or marking it as complete. CPU1 exclusively manages a second cyclic pointer that points to a location or entry in a data path queue in the cyclic buffer. CPU2 manages the media management layer (MML) 138 and specifically read operations. The MML (CPU2) extracts commands from the shared data path queue in the cyclic buffer. CPU2 manages a third cyclic pointer pointing to the cyclic buffer, where movement of the third cyclic pointer (updating the location in the shared data path queue that the pointer is pointing to) by CPU2 releases the entry and indicates completion of the entry. Although three processors 111, 113, 115 are illustrated in the example of FIG. 2B, any multiple of two or more processors dividing up the various tasks of the controller 102 are contemplated.

Modules of the controller 102 may include an inter-processor communication module 112 present on the die of the controller 102. The inter-processor communication module 112 may provide functionality for managing the use of the multiple processors 111, 113, 115, for example the module 112 may include event and processor wake-up communication formats, as well as information on how the processors may interact with the multiple different queues described herein.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller 102. In yet other embodiments, portions of RAM 116 and ROM 118 may be located both within the controller 102 and outside the controller. Further, in some implementations, the controller 102, RAM 116, and ROM 118 may be located on separate semiconductor die. As described in greater detail below, the RAM 116 in the NVM system, whether outside the controller 102, inside the controller or present both outside and inside the controller 102, may contain the a CPU pointer table 117 storing respective pointers used by the CPUs 111, 113, 115 to track locations in a shared data path queue in a cyclic buffer. One or more cyclic buffers 119 associated with the various queues described herein, may also be stored in the RAM 116. A portion of the RAM 116 may also be reserved for a host data buffer (not shown) buffering host data being written to the non-volatile memory 104 and data being read from the non-volatile memory 104.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, SAS, Fibre Channel, USB, PCIe, and NVMe. The host interface 120 typically facilitates transfer for data, control signals, and timing signals.

Back end module 110 includes an error correction controller (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the NVM system 100. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

Additional components of NVM system 100 illustrated in FIG. 2A include the media management layer 138, which performs wear leveling of memory cells of non-volatile memory die 104 and manages mapping tables and logical-to-physical mapping or reading tasks. NVM system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

FIG. 2B is a block diagram illustrating exemplary components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including NAND flash memory cells and/or NOR flash memory cells in a two dimensional and/or three dimensional configuration. Peripheral circuitry 141 includes a state machine 152 that provides status information to controller 102. Non-volatile memory die 104 further includes a data cache 156 that caches data being read from or programmed into the non-volatile memory cells of the non-volatile memory array 142. The data cache 156 comprises sets of data latches 158 for each bit of data in a memory page of the non-volatile memory array 142. Thus, each set of data latches 158 may be a page in width and a plurality of sets of data latches 158 may be included in the data cache 156. For example, for a non-volatile memory array 142 arranged to store n bits per page, each set of data latches 158 may include n data latches where each data latch can store 1 bit of data.

In one implementation, an individual data latch may be a circuit that has two stable states and can store 1 bit of data, such as a set/reset, or SR, latch constructed from NAND gates. The data latches 158 may function as a type of volatile memory that only retains data while powered on. Any of a number of known types of data latch circuits may be used for the data latches in each set of data latches 158. Each non-volatile memory die 104 may have its own sets of data latches 158 and a non-volatile memory array 142. Peripheral circuitry 141 includes a state machine 152 that provides status information to controller 102. Peripheral circuitry 141 may also include additional input/output circuitry that may be used by the controller 102 to transfer data to and from the latches 158, as well as an array of sense modules operating in parallel to sense the current in each non-volatile memory cell of a page of memory cells in the non-volatile memory array 142. Each sense module may include a sense amplifier to detect whether a conduction current of a memory cell in communication with a respective sense module is above or below a reference level.

Figure 3:
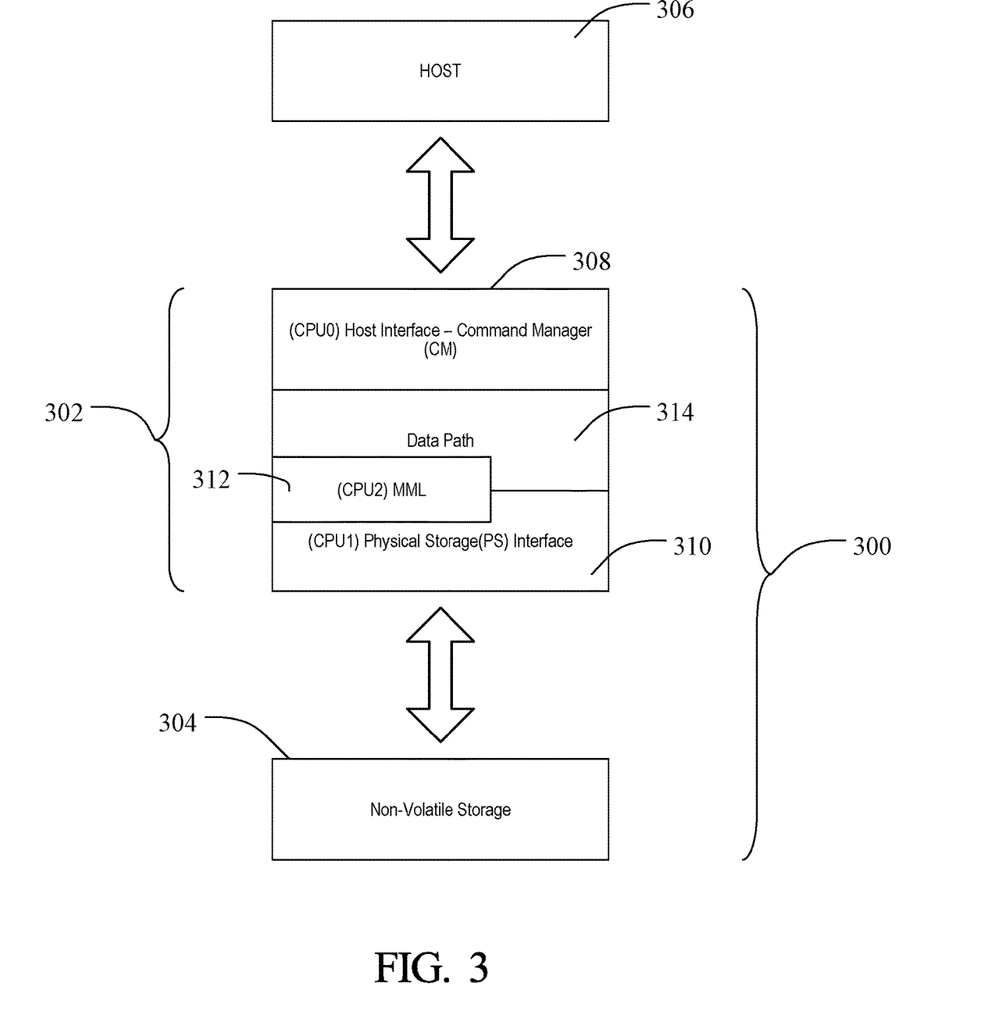
FIG. 3 is a simplified illustration of the system of FIGS. 2A and 2B.

Referring now to FIG. 3, a conceptual and simplified diagram of components of the NVM memory system 100 of FIGS. 2A-2B is illustrated. The non-volatile memory system 300 of FIG. 3 includes a multi-processor controller 302 and non-volatile storage 304. The controller 302 includes the host interface 308, including a command manager (CM) that is executed via CPU0 111, a physical storage (PS) interface 310 executed via CPU1 113, a media management layer (MML) executed via CPU2 115 and a common data path 314 shared by all of the controllers (CPU0, CPU1 and CPU2) for commands from the host 306.

Figure 4:
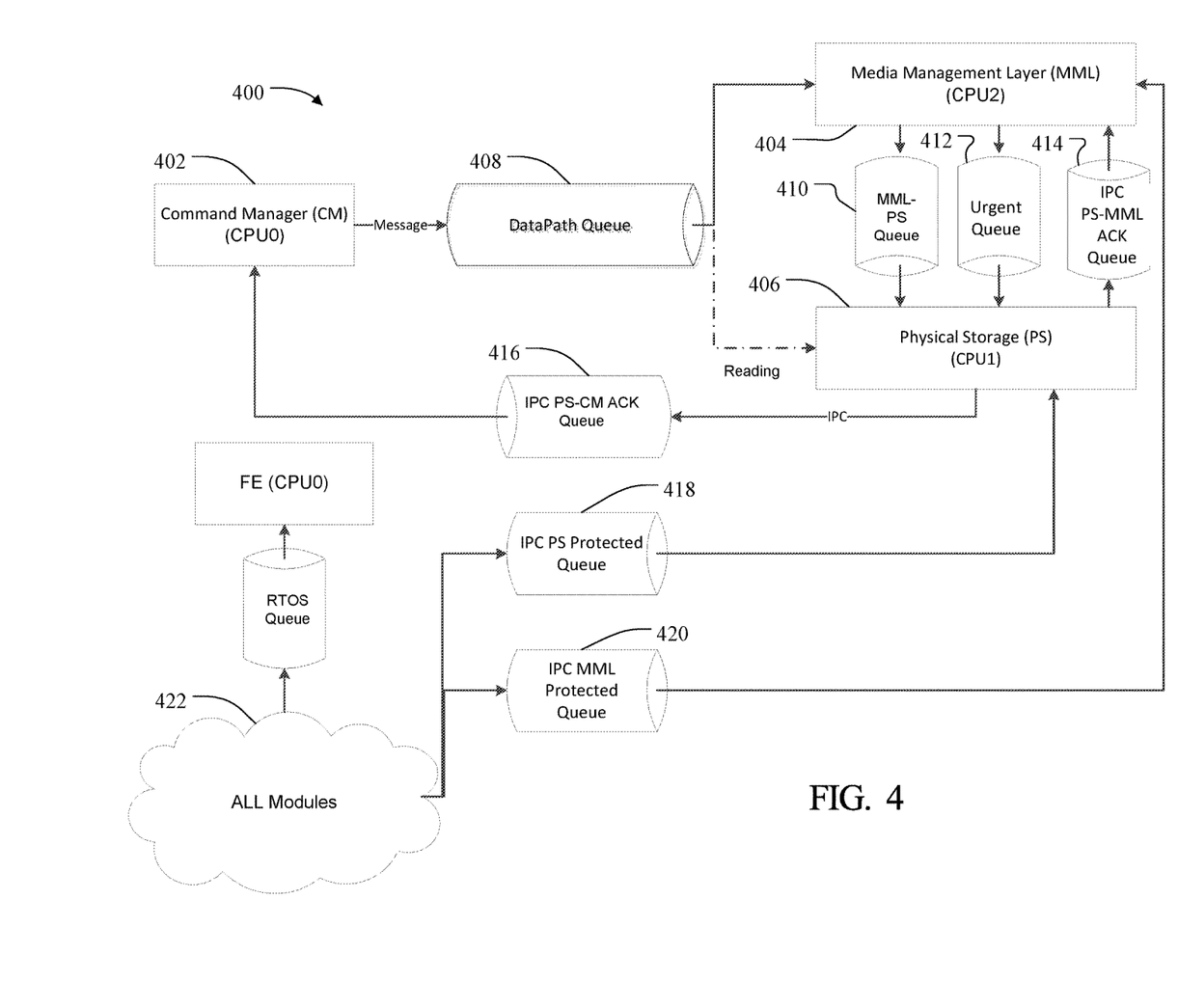
FIG. 4 illustrates an example multi-processor and command queue architecture using the system of FIG. 2A.

FIG. 4 illustrates an example message flow and data queue architecture 400 for a multi-processor non-volatile memory system such as shown in FIGS. 2A and 3. Host commands may be received at the command manager (CM) 402 executed by CPU0. CM 402 places commands from the host on the shared data path queue 408 that is shared with the physical storage (PS) layer 406 utilizing CPU1 and the media management layer (MML) 404 utilizing CPU2. The shared data path queue 408 is the queue in which all commands from the host are inserted by the CM 402. As discussed with respect to FIG. 2A, the data path queue 408 may be stored in a cyclic buffer 119 in RAM 116 in the NVM system 100. In one implementation, only the CM 402 inserts commands into the shared data path queue 408, but the PS 402 and MML 404 may both access and operate on the commands in the data path queue 408. Typically, CPU1 in the PS 406 either operates on and updates a given command in an entry of the data path queue 408 (for example if the command is a write command, as discussed below), or CPU1 simply looks at the command and takes no action other than notifying CPU2 of the presence of the command (for example if the command is a read command, as discussed below). CPU2 reads the command at a later point and operates on the command to handle mapping table updates of lookup. Each of the CPUs utilizes a respective data path queue pointer to permit concurrent operation on command entries in the queue by multiple ones of the processors. Each of the CPUs also uses inter-processor communication messages to alert the other processors of the presence of a command in the shared data path queue 408, or one of the other queues described herein, that is relevant to that other processor.

The data path queue 408 is arranged in a cyclic buffer. The data path queue 408 of FIG. 4 is shown conceptually in a cyclic buffer 500 in FIG. 5 to better illustrate the workings of the separate pointers 502, 504 and 506 used by the separate processors CPU0 111, CPU1 113, CPU2 115. Each processor 111, 113, 115 has its own pointer and each pointer can only be moved in the same single direction 510 (illustrated as a clockwise direction in this example) as the processors work their way through the entries 508 in the representation of the data path queue cyclic buffer of FIG. 5. In one implementation, each processor can only update its own pointer 502, 504, 506, but all three pointers are viewable by all of the processors. The processors are configured to send inter-processor communication messages, such as interrupt requests, to each other to coordinate the cyclic movement of the pointers. The data path queue cyclic buffer and the pointers, as well as the other queues noted below, may be stored in RAM 116 in the controller 102 or outside of the controller. The three pointers permit the three processors to simultaneously access or operate on different entries of the data path queue 500 without the possibility of overwriting valid commands or messages and without the need for a mutual exclusion (mutex) software application that can lock out a shared data path to all but one processor.

The prevention of overlap of the pointers may be implemented by preventing a processor from updating its pointer to point to a next location 508 in the data queue 500 if that next location is already pointed to by another processor's pointer. In one embodiment, each processor may update its pointer to point to a next location in the single permitted direction of movement in the cyclic buffer after that processor has completed its activity on the current entry it is pointing to. Before it can update its pointer, that processor must first look to the pointer of the processor that is ahead of it to see if it is occupying that next location. Because each processor's pointer will always be following just one other processor's pointer in the cyclic buffer, each processor only needs to determine the position of one other pointer and may always ignore the position of the remaining pointer(s). This allows for implementation of the method to even larger numbers of processors than the three processor example illustrated in FIG. 5. If a processor looks at the pointer for the next processor ahead in the direction of movement 510 permitted through the buffer and sees that the pointer of that next processor is occupying (pointing to) the next sequential location in the cyclic buffer, then the processor must wait until that pointer moves and cannot operate on the data path queue again until the prior pointer has been updated to point to another location. In addition, the first pointer for the command manager CPU (CPU0) may not need to move its pointer in situations where there is nothing to insert into the queue, such as when there is no external request from the host or an internal request that has been received.

Figure 5:
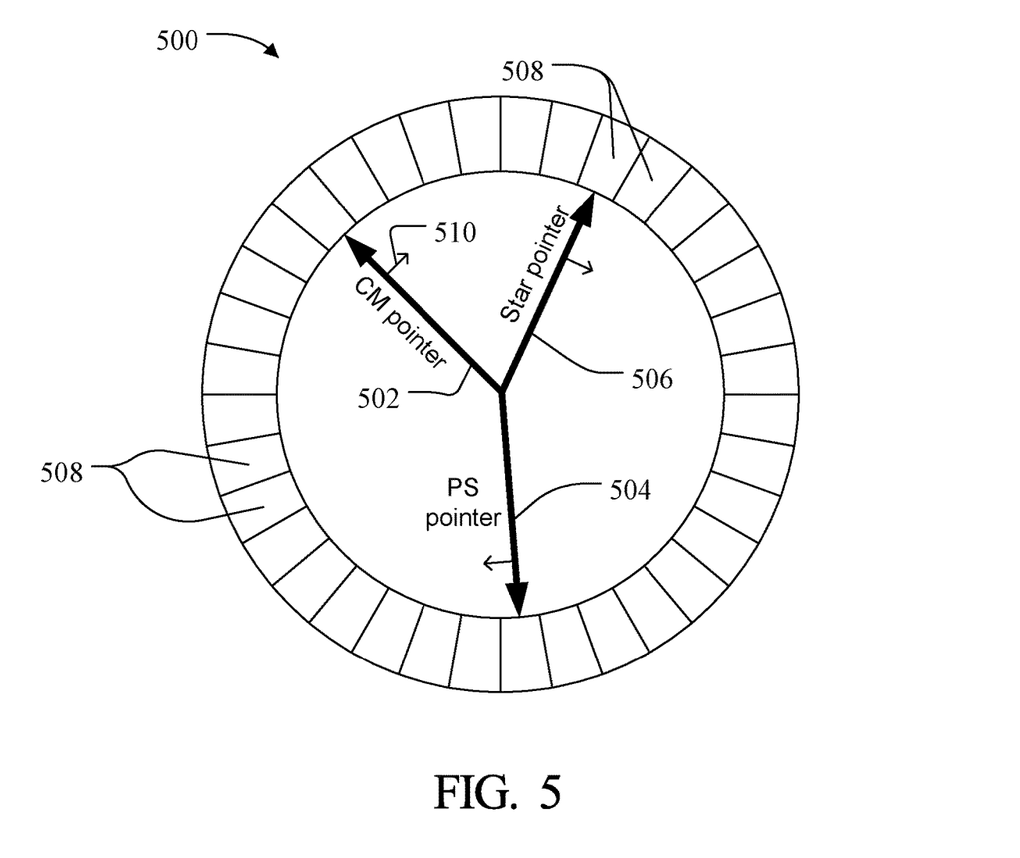
FIG. 5 illustrates a shared data path queue in a cyclic data buffer having pointers for each of a plurality of processors

Use of the separate data path queue pointers 502, 504, 506, permits the NVM system 100 to keep processors from overlapping commands in the data path queue and thus avoids potential corruption or loss of command data. Although each processor may be completing its tasks at each location in the queue at a different rate and the pointers may often be spaced apart by multiple locations, the different rates may lead to one processor catching up in the data path queue to another processor. The requirement that no processor may update its pointer to point to a location currently pointed to by another processor's pointer provides a relatively simple tool to avoid overlap and destruction of command information in the shared data path.

Referring again to FIG. 4, in addition to the main data path cyclic buffer 408, additional queues are utilized. An MML-PS queue 410 is used by the MML 404 for providing physical block addresses associated with logical block addresses to the PS layer 406. Only the MML 404 may insert events into the MML-PS queue 410 and send an inter-processor command (IPC) message to the PS layer 406 notifying it that the physical address for a read command is waiting. The IPC PC-CM ACK queue 416 can only be updated by the PS (CPU1) layer 406 during a write operation. When a write occurs and is acted on by the PS layer 406, the acknowledgment that that write has been completed is received by CPU1 and inserted as an event into the IPC PC-CM ACK queue 416 so that the CM 402 (CPU0) knows when it can release the data buffer in the NVM system containing the host data for that command. The MML-PS queue 410 is a queue that only receives input from the MML 404 (CPU2) on a data read and contains entries created by MML showing the physical address retrieved by the MML that is associated with a logical address in a read command. The PS layer 406 (CPU1) can then act on that by accessing the MML PS queue to retrieve data from the physical address noted in the entry. The urgent queue 412 is another queue that only has entries inserted by the MML (CPU2) 404 and is only read by the PS layer (CPU1) 406. Entries generated for the urgent queue 412 by the MML 404 relate to urgent events that supersede the priority of anything in the MML PS queue 410. For example, there may be times when the MML 404 needs to write an update to the main mapping table in the non-volatile memory and it is advantageous for performance reasons to complete the operation quickly in order to free the mapping table and CPU for other operations. The PS layer (CPU1) 406 knows to always take events in the urgent queue 412 ahead of the MML PS queue 410 to avoid situations such as those. The IPC PS-MML ACK queue 414 between CPU1 and CPU2 is a queue that has events inserted only from CPU1 and is extracted by CPU2 in this implementation. For example, there may be times when a read command comes in to a particular logical block address and the MML (CPU2) 404 realizes that the portion of the mapping table that includes that particular logical block address is not currently in RAM 116 so that it needs to be read from non-volatile memory 104 (see FIG. 2A). In that case, the MML (CPU2) 404 will generate an event in the MML PS queue 410 requesting the PS layer (CPU1) 406 read the mapping table in non-volatile memory for that data. Subsequently, when the PS layer (CPU1) 406 has retrieved that mapping information from the physical location in non-volatile memory, it places it in the IPC PS-MML ACK queue 414 and sends an inter-processor event message to the MML 404 indicating that the address information is present in an entry in the queue.

In addition to the shared data path queue with pointer protected cyclic buffer protection discussed above, it is contemplated that other queues that include standard mutex (mutual exclusion) software functions may also be included in the NVM system 100. For example, queues for lower priority commands that are not directly related to handling host data may be used with mutex software. These other queues, for example the IPC PS protected queue 418 and the IPC MML protected queue 420 may accept input from multiple modules 422. These multiple modules 422 may include the front end module 108 (FIG. 2A) and other modules in the NVM system that may have lower priority applications that typically don't deal directly with host data. For example, an IPC PS protected queue 418 may be used when there is a need to request certain statistical data or health data from the PS layer 406, such as the number of write operation failures or read operation failures that have occurred in the non-volatile memory 104. The IPC PS protected queue 418 may have commands inserted by multiple modules 422 for requests that are directed to the physical storage layer (CPU1) 406. Other health or maintenance type queries from various modules within the NVM system that are directed to the NNL 404 go through a separate protected queue, the IPC MML protected queue 420, such as those requests directed to wear leveling statistics and health which may require statistics on the number of program and erase cycles or a percentage of program and erase cycles used for the NVM system. Because the timing and demand for this information is much less critical than the host data commands handled by the cyclic buffer example of FIG. 5, the loss of processing efficiency of commands in the IPC PS protected and IPC MML protected queues 418, 420 resulting from using mutex software protection is generally not an issue.

Figure 6:
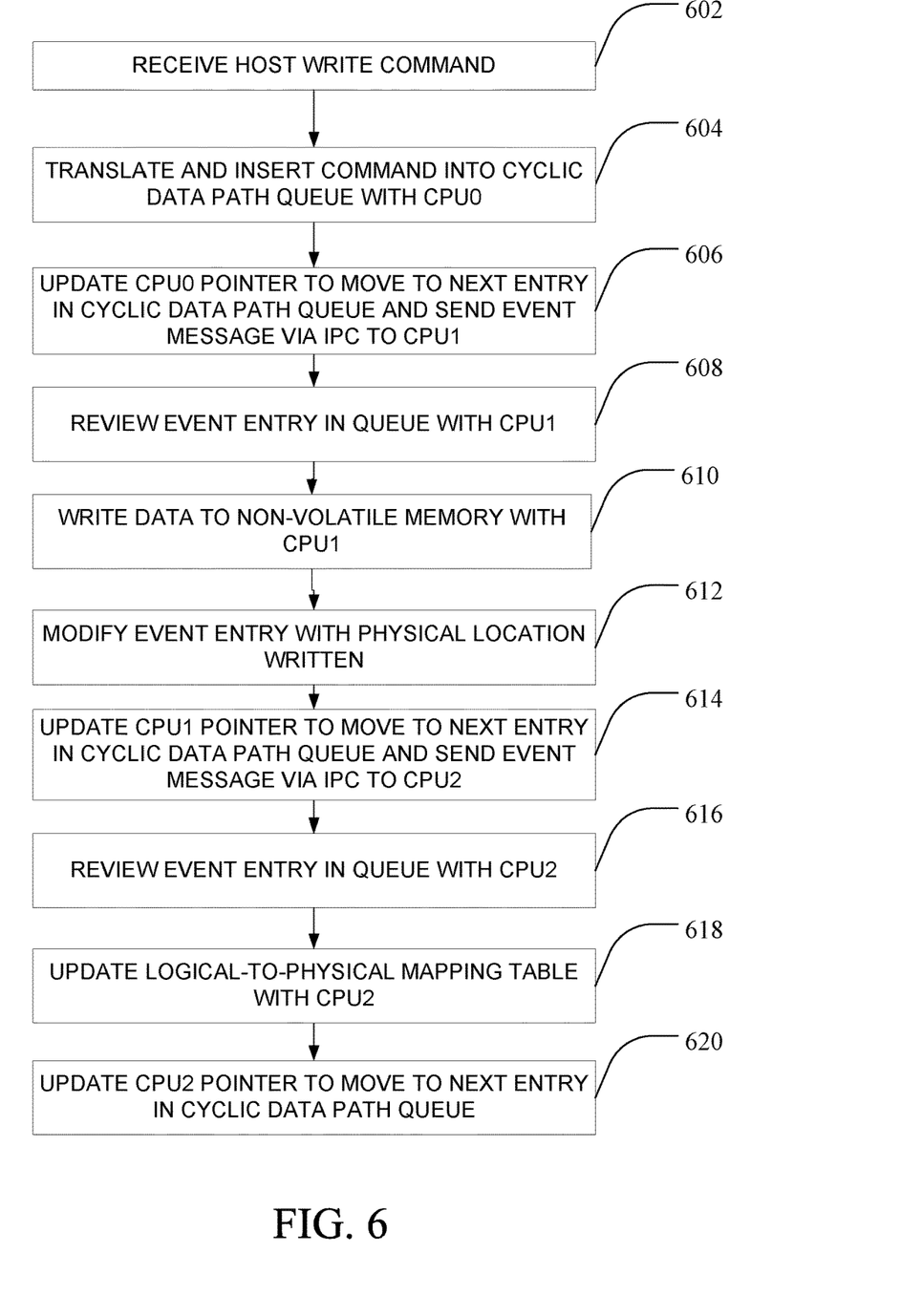
FIG. 6 is a flow diagram illustrating an embodiment of a method of writing data in a multi-processor system such as shown in FIG. 2A.

Referring now to FIG. 6, an example of using the shared data path queue with cyclic buffer pointers and multiple queues above is shown for a write operation. When a host write command first arrives at the non-volatile memory (NVM) system 100, the command manager (CPU0) 402 inserts the command into the cyclic queue (at 602). The write command is translated by the command manager 402 to confirm with internal command formats for the NVM system (at 604). After inserting the commands into the data path queue, CPU0 then updates its data queue pointer 502 to point to the next available event location 508 in the queue 500 and CPU0 generates an inter-processor communication event message and alerts CPU1 in the physical storage layer that the command is present in the queue 500 (at 606). The inter-processor communication message may be an event message such as an interrupt or other type of inter-processor communication message that will "wake-up" CPU1 if CPU1 has been idle. CPU1, when it reaches the location 508 in the queue 500 where the write command inserted by CPU0 exists, will read the write command and write the data associated with the logical block address included in that write command to the non-volatile memory (at 608, 610).

After executing the write command, CPU1 will then update the same write command entry in the queue 500 to include the physical storage location in the non-volatile memory that the data associated with the logical block address in the command was written to (at 612). After updating the field in the command message with the physical address to be associated with the host logical block address, CPU1 updates its pointer 504 to move the pointer to the next event location 508 in the data path cyclic queue 500 and also sends an inter-processor communication to CPU2 (the processor handling the media management layer applications) to alert CPU2 to "wake-up" if it is currently idle and look at the cyclic data path queue 500 (at 614). When the pointer for CPU2 reaches the event location in the data path cyclic queue with the write command, it reviews the event entry and updates the logical-to-physical mapping table for the non-volatile memory so that the write event initiated by CPU1 is recorded (at 616, 618). CPU2 finishes the update to the mapping table, it updates it's pointer to the next position in the data path cyclic queue 500 and takes any action on the command at that next event location.

It should be noted that another message is sent back to the command manager (CPU0) 402 from the PS layer 406 (CPU1) when confirmation is received is subsequently received at CPU1 from the non-volatile memory that the write to non-volatile memory has been fully completed. The acknowledgement is inserted as an event into the acknowledgement queue (IPC PS-CM ACK Queue) by CPU1 and an IPC message sent to CPU0 so that, when the command manager (CPU0) 402 has a chance to retrieve the event in that queue 416, the command manager can then release the host data buffer in the NVM system that is holding a copy of the data that was just written to the non-volatile memory. That confirmation event inserted into the acknowledgement queue 416 may happen at some point after the PS layer 406 has requested that the write occur and after the CPU2 has already updated its pointer and sent the IPC message to CPU1 for that particular command. In other words, it is possible that the message from PS layer (CPU1) 406 regarding the acknowledgment of write completion may occur after one or more other command events in the queue have been acted on by CPU1. This is just one example of the asynchronous operations of the multiple processors.

It should be noted that the individual pointers 502, 504, 506 that each CPU 111, 113, 115 has pointing to a different location in the cyclic data path queue 500 only be updated by its respective processor. Also, before each of the processors (CPU0, CPU1, CPU2) may update where a pointer is pointing, it first looks to where the pointer in front of it is pointing to prevent pointers from pointing to a same location where the processors may then overwrite valid commands or messages in the queue 500. With respect to which pointer is in advance of another, referring again to FIG. 5, the pointer distribution for CPU0, CPU1 and CPU2 is illustrated where the CM pointer (CPU0) 502 always precedes the next pointer for the PS layer (CPU1) 504 which, in turn, always precedes the for the MML (CPU2) pointer 506. In the cyclic data path queue 500, the pointers are only allowed to move in the same direction 510. The multiple pointer multiprocessor architecture discussed herein permits concurrent operation on different entries of the queue without overlap or corruption. For example, the CM (CPU0) 402 may be continuously inserting commands from the host into sequential entries in the cyclic data buffer queue, the PS layer (CPU1) 406 may be a few location back from where the CM 402 is currently inserting commands in the data path queue and concurrently modifying those earlier inserted commands (that were write entries) with for example, the physical addresses associated with the logical block address of those particular commands.

Figure 7:
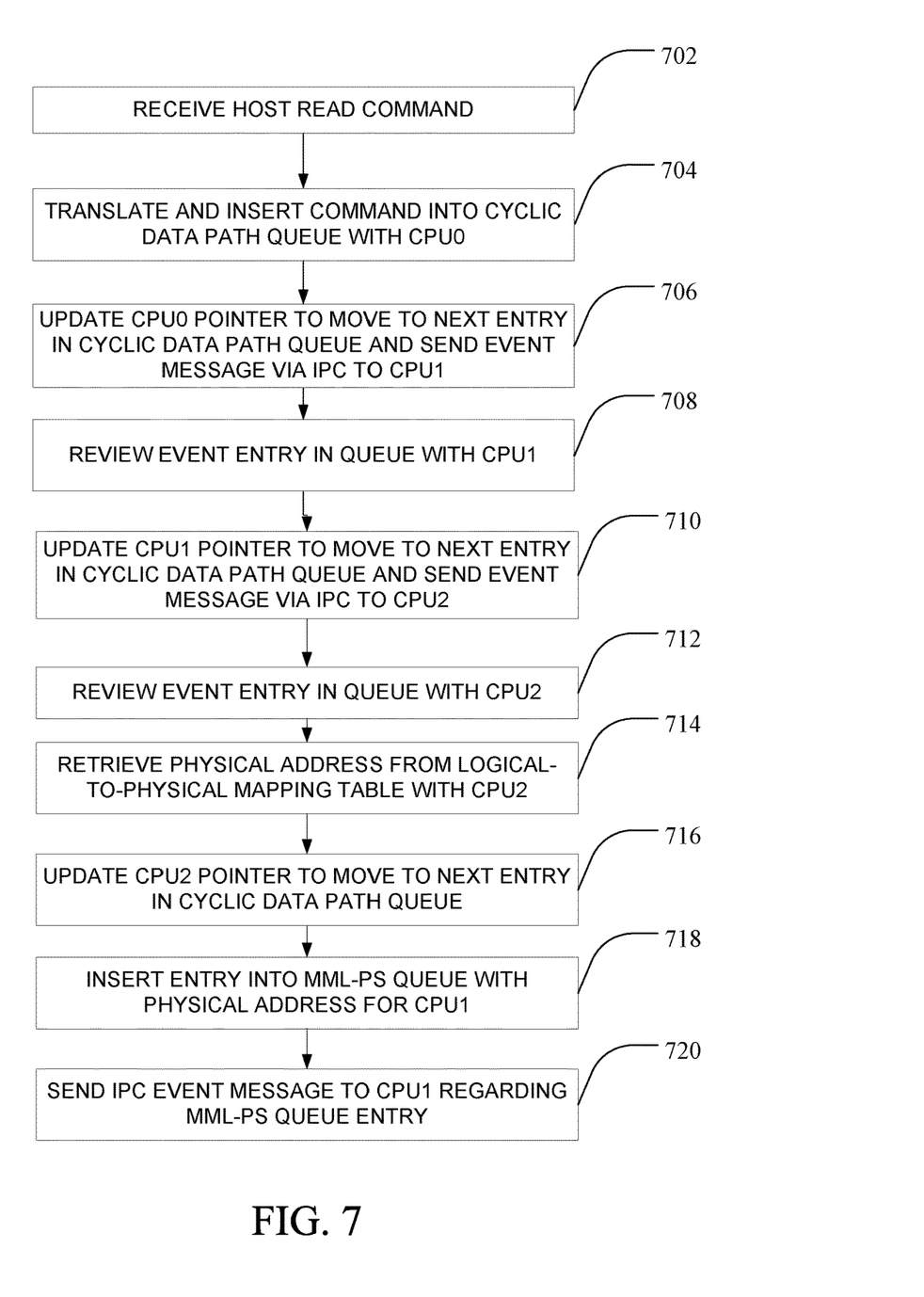
FIG. 7 is a flow diagram illustrating an embodiment of a method of reading data in a multi-processor system such as shown in FIG. 2A.

Referring now to FIG. 7, method for implementing host read commands through the cyclic data buffer queue 500 is illustrated. When the host command received by the command manager (CPU0) is for a read (at 702), the command manager 402 inserts the translated read command (at 704) into an entry in the cyclic data buffer, updates its pointer 502 to point to the next entry and sends an IPC event message to CPU1 (at 706). When the PS layer (CPU1) 406 has completed any other commands at intervening locations 508 and the pointer for CPU1 reaches that event entry, it notes that the command is for a read command in that no action is necessary on its part (at 708). CPU1 will then inform the MML (CPU2) 404 that it needs to take action. Thus after reviewing and not acting on the read command, CPU1 moves it's pointer to the next entry in the cyclic data queue and sends and IPC message to the MML (CPU2) (at 710). MML (CPU2) 404, when it has completed whatever other events precede the above-noted event, extracts the read command and looks up the physical address in the mapping table associated with the host LBA contained in the read command (at 712, 714).

Once MML (CPU2) 404 has received the information from the mapping table, it updates its pointer 506, generates an event in a separate queue, the MML-PS queue 410, and sends an IPC message to the physical storage back end (CPU1) that it needs to look at the MML PS queue 410 (at 716, 718, 720). The physical storage back end (CPU1) will then, at the time it reaches the event in the MML PS queue 410, open the event in that queue, and provide the physical address to the flash controller which will pass the information to the automated read path for automatically retrieving the data at the identified address from the non-volatile memory and sending it to the host. In addition to the read and write commands that may be inserted into the cyclic data path queue, insertion of any of a number of other host commands is also contemplated. Some examples of such other commands may include, without limitation, a flush cache command, a trim command for providing advance notice of data to be deleted, and a power management message command.

In the present application, semiconductor memory devices such as those described in the present application may include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional exemplary structures described but cover all relevant memory structures within the spirit and scope of the invention as described herein and as understood by one of skill in the art.

Methods and systems have been disclosed for implementing a multi-processor controller architecture without the need for locking a data path by permitting only one processor at a time to access a shared data path queue. Instead, the disclosed method and system utilize a cyclic data buffer containing a shared data path queue of host commands. Separate pointers to the shared data path queue and controlled by a respective one of the multiple controllers permit multiple ones of the processors to concurrently access and update commands and data in the queue while avoiding overlap and thus avoiding the need for a mutex software protection and associated delay. The ability to allow concurrent operation of multiple processors on different commands in the shared data path queue may provide greater performance in large data throughput NVM systems. The same techniques applied to multiple processors seeking to concurrently execute on different locations of a shared data path queue may also be applied to a single processor NVM system that is handling multiple thread processes. The multiple thread processes may be provided a more efficient environment within which to execute using the techniques described above for multiple processors.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

We claim:

1. A method for managing operations in a non-volatile memory system having a controller with a plurality of processors and a data path queue shared by the plurality of processors, the method comprising:
    a first processor of the plurality of processors in the controller inserting host command data for a received host command at a first entry location of the shared data path queue;
    the first processor updating a first pointer to point to a next entry location adjacent to the first entry location in the shared data path queue after inserting the host command data at the first entry location;
    a second processor of the plurality of processors in the controller accessing data in a different entry location in the shared data path queue, and executing an operation in the non-volatile memory system relating to the accessed data in the different entry location in the shared data path queue, concurrently with the first processor inserting the host command data at the first entry location;
    when the first pointer is not pointing to a second next entry location in the shared data path queue immediately adjacent to the different entry location, the second processor updating a second pointer to point to the second next entry location;
    when the first pointer is pointing to the second next entry location in the shared data path queue, the second processor waiting until the first pointer moves away from the second next data entry location before updating the second pointer to point to the second next entry location; and
    updating data in the first entry location to include a physical storage location in a non-volatile memory of the non-volatile memory system.

2. The method of claim 1, wherein the shared data path queue is stored in a cyclic data buffer.

3. The method of claim 2, wherein updating the first pointer and updating the second pointer comprises the first processor only moving the first pointer in a single direction along the cyclic data buffer and the second processor only moving the second pointer in the single direction along the cyclic data buffer.

4. The method of claim 1, further comprising the first processor transmitting a message to the second processor after updating the first pointer.

5. The method of claim 1, wherein the received host command is a write command and wherein the method further comprises, when the second pointer points to the first entry location, the second processor reading the write command from the first entry location and writing data associated with a logical block address included in the write command to the non-volatile memory.

6. The method of claim 5, wherein the updating of the data in the first entry location to include the physical storage location in the non-volatile memory is performed by the second processor upon writing the data associated with the logical block address to the non-volatile memory.

7. The method of claim 1, wherein the received host command is a read command and wherein the method further comprises:
    when the second pointer points to the first entry location, the second processor reading the read command from the first entry location and transmitting a message to a third processor of the plurality of processors; and
    when a third pointer associated with the third processor reaches the first entry location, the third processor retrieving from a mapping table a physical location of data associated with a logical block address in the read command.

8. A non-volatile memory system comprising:
    a non-volatile memory;
    a shared data path queue for host commands, the shared data path queue having a plurality of entry locations;
    a controller in communication with the non-volatile memory and the shared data path queue, the controller comprising:
        a plurality of processors, wherein each of the plurality of processors is configured to:
            exclusively control a respective data path queue pointer pointing to a respective one of the plurality of entry locations;
            operate on, or update, a respective host command in an entry location currently pointed to by its respective data path queue pointer; and
            after operating on or updating the respective host command, update its respective data path queue pointer to point to a next entry location in the shared data path queue only when the next entry location is not already being pointed to by another data path queue pointer;
        wherein each of the plurality of processors is configured to concurrently operate on different host commands in different ones of the plurality of entry locations in the shared data path queue; and wherein at least one of the plurality of processors is configured to update data in one of the plurality of entry locations to include a physical storage location in the non-volatile memory.

9. The non-volatile memory system of claim 8, wherein the shared data path queue is stored in a cyclic data buffer.

10. The non-volatile memory system of claim 9, wherein each of the plurality of processors is configured to only update its respective data path queue pointer in a same single direction of the circular data buffer.

11. The non-volatile memory system of claim 10, wherein the next entry location comprises an entry location adjacent to a current entry location being pointed to by the respective data path queue in the same single direction.

12. The non-volatile memory system of claim 9, further comprising a volatile memory wherein the cyclic data buffer and each respective data path queue pointer are maintained in the volatile memory.

13. The non-volatile memory system of claim 8, wherein the non-volatile memory comprises a silicon substrate and a plurality of memory cells forming a monolithic three-dimensional structure, wherein at least one portion of the memory cells is vertically disposed with respect to the silicon substrate.

14. The non-volatile memory system of claim 10, wherein a first processor of the plurality of processors, the first processor having a first data path queue pointer, is configured to, in response to receipt of a host write command, insert the host write command into a first entry location in the data path queue.

15. The non-volatile memory system of claim 14, wherein a second processor of the plurality of processors is configured to, after the first processor has moved the first data path queue pointer from the first entry location:
move a second data path queue pointer associated with the second processor to point to the first entry location; and
write data associated with the host write command of the first entry location to the non-volatile memory.

16. The non-volatile memory system of claim 15, wherein a third processor of the plurality of processors is configured to, after the second processor has moved the second data path queue pointer from the first entry location:
move a third data path queue pointer associated with the third processor to point to the first entry location; and
update a mapping table with logical-to-physical mapping information for the data associated with the host write command.

17. A method for managing operations in a non-volatile memory system having a non-volatile memory, a controller in communication with the non-volatile memory and having a plurality of processors, and a data path queue for host commands, the data path queue shared by the plurality of processors, the method comprising:
a first processor of the plurality of processors in the controller performing a first operation relating to a first host command at a first entry location of the shared data path queue;

after performing the first operation, the first processor updating a first pointer to point to a first next entry location adjacent to the first entry location in a predetermined direction along the shared data path queue after performing the first operation at the first entry location;
a second processor of the plurality of processors in the controller performing a second operation to a second host command at a second entry location in the shared data path queue concurrently with the first processor performing the first operation at the first entry location, the second operation comprising updating and storing data in the second entry location related to the second host command;
after performing the second operation, the second processor updating a second pointer to point to a second next entry location in the shared data path queue, the second next entry location being adjacent to the second entry location in the predetermined direction along the shared data path queue, when the second next entry location is not already being pointed to by the first pointer; and
updating data in the first entry location to include a physical storage location in the non-volatile memory,
wherein the first processor performs the first operation and updates the first pointer at a different rate than the second processor performs the second operation and updates the second pointer.

18. The method of claim 17, wherein when the second entry location is already being pointed to by the first pointer, the second processor waiting until the first processor moves the first pointer from the second entry location before updating the second pointer such that only one processor is able to operate on the second entry location at any given time.

19. A non-volatile memory system comprising:
a non-volatile memory;
a shared data path queue for storing host commands directed to the non-volatile memory, the shared data path queue having a plurality of entry locations; and
a controller in communication with the non-volatile memory and the shared data path queue, the controller comprising:
a plurality of processing means, each of the plurality of processing means for operating on different host commands in the shared data path queue concurrently with each other of the plurality of processing means, and each of the plurality of processing means for exclusively managing movement of a respective shared data path entry pointer for preventing concurrent operations with each other of the plurality of processing means a same command in a same entry location of the shared data path queue;
wherein at least one of the plurality of processing means is configured to update data in one of the plurality of entry locations to include a physical storage location in the non-volatile memory.

* * * * *